United States Patent [19]

Wharton

[11] 4,389,645
[45] Jun. 21, 1983

[54] WELL LOGGING FIBER OPTIC COMMUNICATION SYSTEM

[75] Inventor: Russell P. Wharton, Houston, Tex.

[73] Assignee: Schlumberger Technology Corporation, Houston, Tex.

[21] Appl. No.: 184,704

[22] Filed: Sep. 8, 1980

[51] Int. Cl.³ .............................................. G01V 1/40
[52] U.S. Cl. ..................................... 340/854; 350/96.2
[58] Field of Search ....................... 340/854–858; 455/617, 619, 607, 610, 612, 613; 33/312; 250/263; 350/96.2; 367/81; 358/901

[56] References Cited

U.S. PATENT DOCUMENTS

| 3,670,099 | 6/1972 | Oliver | 358/901 X |
|---|---|---|---|
| 3,792,284 | 2/1974 | Kaelin | 250/551 |
| 3,905,010 | 9/1975 | Fitzpatrick | 340/855 |
| 3,922,063 | 11/1975 | Marrone | 350/96 |
| 3,934,246 | 1/1976 | Mueller | 340/324 R |
| 4,124,272 | 11/1978 | Henderson et al. | 350/96.21 |
| 4,162,400 | 7/1979 | Pitts, Jr. | 340/854 |
| 4,189,705 | 2/1980 | Pitts, Jr. | 340/854 |
| 4,190,318 | 2/1980 | Upton, Jr. | 350/96.2 |

OTHER PUBLICATIONS

"Computers and Advanced Technology Applied to Geophysical and Ocean Exploration II," *Midcon Professional Program* 1980-Nov. 4-6, Computers and Advanced Technology Applied to Uranium Borehole Logging Systems, Meisner, pp. 1-15.

*Primary Examiner*—Richard A. Farley

[57] ABSTRACT

To facilitate use of logging cables with fiber optic signal conductors, the optic source and detector at the surface are mounted on the winch drum. Electrical signals communicate between the control/processing unit and the optic source and detector on the winch drum.

12 Claims, 3 Drawing Figures

WELL LOGGING FIBER OPTIC COMMUNICATION SYSTEM

BACKGROUND OF THE INVENTION

The present invention relates to well logging, and more particularly to a communication system for measuring characteristics of earth formations in a borehole using fiber optic logging cables.

As an oil well is being drilled, a sonde is usually lowered periodically into the borehole to measure characteristics of the earth formations it traverses. Power, communication and control instructions, and data are then relayed between the sonde and instrumentation and control facilities at the surface of the earth through a logging cable which supports and moves the sonde within the borehole. As measurements and measuring instruments have become more sophisticated, data transmission rates through the cable have increased to the point where existing cables can become saturated.

Fiber optic technology can increase data transmission rates several orders of magnitude, and fiber optic cable logging systems for this purpose have been proposed. Since the cable is wound onto and off a rotating winch drum at the surface as the sonde is raised and lowered in the borehole, these prior art devices have coupled the optical signals through optical slip rings to stationary signal processing equipment at the surface (adjacent the wellhead).

Due to the extreme precision required for optical slip rings, such systems are not ideal for well logging applications. The extremely small optical fibers must be maintained in exact alignment for efficient light energy coupling. However, the winch drums and cables typically weigh several tons. During transportation from one well to another, the equipment must withstand many miles of abuse in hostile terrain. During the logging operation, the winch drum may pull upon the logging cable with thousands of pounds of force. To meet these demands, the journals supporting the winch drum are of a size and design wholly inappropriate to the extreme precision required for optical slip rings. Journals which could also meet such optical requirements would be prohibitively expensive.

A need therefore remains for a well logging fiber optic communication system which can inexpensively, effectively and reliably couple optical information between a fiber optic cable and the control and information processing facilities outside the winch drum at the top of the borehole.

SUMMARY OF THE INVENTION

Briefly, the present invention meets the above needs and purposes with a well logging fiber optic communication system in which the wellhead electrooptical interface (i.e., one or more optical/electrical transducers) is mounted on the winch drum itself, for rotation with the drum and the fiber optic communication cable wound thereon. Information is then transmitted electrically between the electro-optical interface and the system control/processing unit through one or more high frequency electrical slip rings on the winch drum. The need for a precision optical slip ring to couple optical signals into and out of the winch drum is thus eliminated.

In a particular embodiment of the invention, a borehole tool is connected to one end of a communication cable having fiber optic means therein for conducting light signals. The tool includes a sonde and suitable electronics for measuring characteristics of earth formations in a borehole, converting the measurements into modulated light signals, and launching the modulated light signals into the fiber optic means in the cable. A rotatable winch drum supports the cable at the upper end of the borehole for lowering and raising the cable into and out of the borehole as the winch drum is rotated. An electro-optical transducer, which is mounted on the drum for rotation therewith, is coupled to the end of the cable opposite the tool, for receiving the optical signals and converting them into electrical signals representative of the earth formation measurements. These electrical signals are then transmitted (for example, through high frequency electrical slip rings) to a receiver (such as a data processor or recorder) which is located outside the winch drum. In this manner the information originally carried by the modulated light signals is conveyed out of the rotatable winch drum without the use of optical slip rings.

It is therefore an object of the present invention to provide a well logging fiber optic cable winch drum, communication system, and method, in which an electro-optical interface is mounted on a rotatable cable winch drum; in which the interface converts optical signals received from the cable into electrical signals representative of measurements made of the earth formations within the borehole; in which the electrical signals are then transmitted from the interface to a receiver outside the drum thereby conveying the information carried by the light signals out of the rotatable winch drum without the use of optical slip rings; in which the interface may also receive electrical signals, convert them into light signals, and launch them into the fiber optic cable; and to accomplish the above objects and purposes in an inexpensive, reliable, durable, and versatile configuration readily suited for use in even the most demanding well logging environments.

Other objects and advantages of the invention will be apparent from the following description, the accompanying drawings, and the appended claims.

DESCRIPTION OF THE PREFERRED EMBODIMENT

Figure 1:
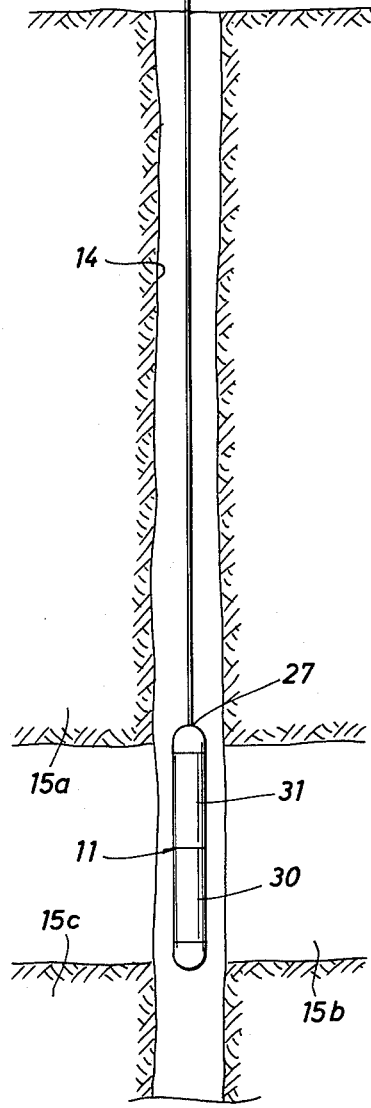
FIG. 1 is a diagrammatic side view of a well logging communication system according to the present invention.

With reference to the drawings, FIG. 1 shows a well logging system 10, which includes a borehole tool 11 connected to the lower end of a communication cable 12 within a borehole 14, for measuring characteristics of various earth formations 15a, b, and c traversed by the borehole. One end of the cable 12 is wound on a rotatable winch drum 17 at the surface of the earth adjacent the upper end of the borehole 14. Drum 17 supports cable 12 for lowering and raising it and tool 11 into and out of the borehole 14 as the drum is rotated. As illustrated, winch drum 17 forms part of a mobile well logging apparatus 19, which in this case is a logging truck containing a control/processing unit 20 for controlling operation of the winch 17 and tool 11, and receiving and processing measurement information sent from tool 11 through cable 12.

Figure 2:
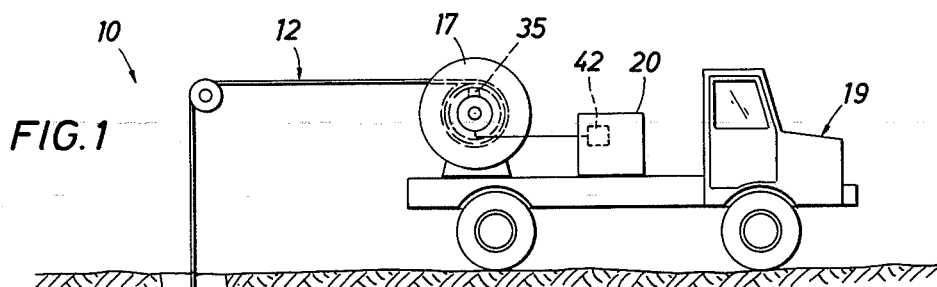
FIG. 2 is an enlarged, partially broken away perspective view of the logging cable drum in FIG. 1.
Figure 2:
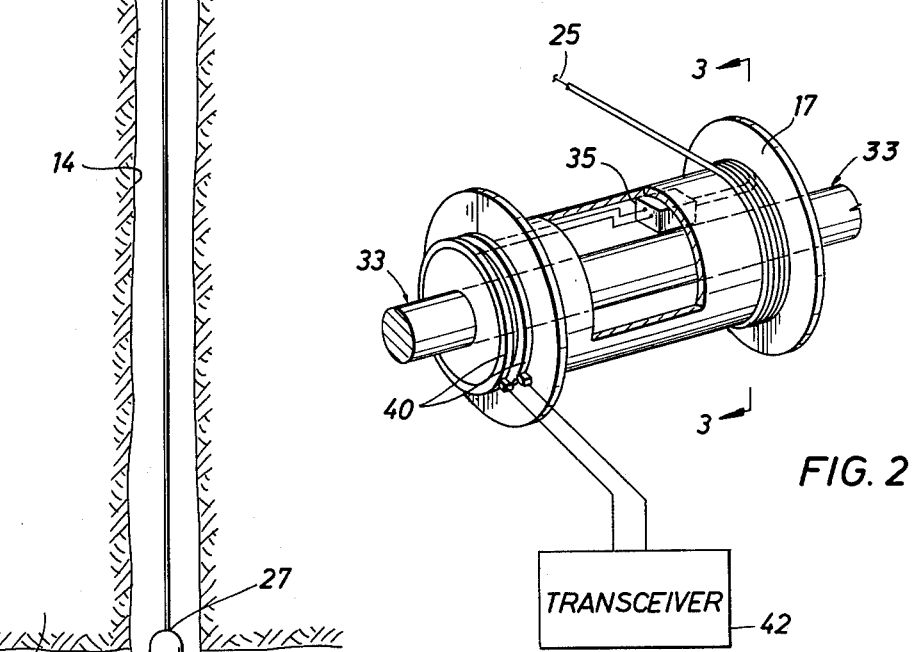

Within cable 12 is a fiber optic means consisting of one or more optical fibers 25 (FIG. 2) for conducting light signals through the cable 12. Tool 11 is connected to the lower end 27 of optical fibers 25 on the end of cable 12 within the borehole 14. A sonde 30 in tool 11 measures characteristics of the earth formations 15a, b, and c within borehole 14, and an electronics cartridge 31 converts the measurements into modulated light signals and launches the modulated light signals into one of the optical fibers 25. Since a variety of suitable devices is known for measuring earth formation characteristics, representing these as electrical signals, converting electrical signals into modulated light signals, and launching modulated light signals into optical fibers, further details of tool 11 need not be given.

Figure 3:
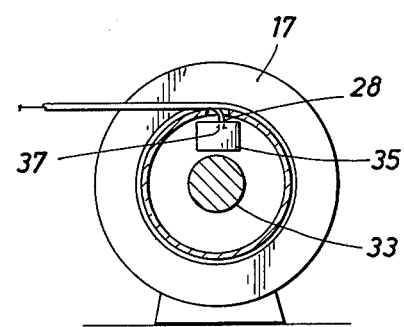
FIG. 3 is a cross-sectional view of the drum taken on line 3—3 in FIG. 2.

Winch drum 17, which rotates on journals 33, has an electro-optical transducer or interface 35 mounted thereon. Transducer 35 thus moves and rotates with the winch drum 17. Transducer 35 has a coupler 37 (FIG. 3) which is coupled to the upper end 28 of the optical fibers 25. In the preferred embodiment, the winch drum transducer 35 is bi-directional: it receives the modulated light signals sent by tool 11 and converts the signals into electrical signals representative of the earth formation measurements, and it receives other electrical signals (such as command/control signals for the tool 11), converts these into modulated light signals, and launches them into the cable for transmission downhole to the tool. The various electrical signals are conducted into and out of drum 17 through high frequency electrical slip rings 40 connected to a transceiver 42 in the control/processing unit 20. The electrical slip rings 40 and winch drum transducer 35 thereby provide for transmitting electrical signals between transducer 35 and transceiver 42 which convey the information which, within cable 12, was carried by the modulated light signals. The information is thus conveyed into and out of the rotatable winch drum 17 without optical slip rings.

As may be seen, therefore, the present invention has numerous advantages. Principally, it provides a well logging fiber optic communication system which does not need optical slip rings. The winch drum 17 can therefore be supported on journals 33 which are optimized for load bearing, since they are not required to maintain precision optical slip ring alignments. The precise location of transducer 35 on drum 17 is, of course, a matter of convenience and choice. It can be "in" the drum, "on" the drum, at one end or the other, distributed in several discrete packages thereon, and so forth. It can use a plurality of slip rings on one end or the other, or both. As used herein, therefore, these terms are intended to be equivalent. Further, although current data rates are not generally in excess of 2-5 MHz, if higher data rates are required, transducer 35 may communicate with transceiver 42 by other or additional electrical slip rings, radio links, etc., as may be appropriate. Finally although transducer 35 in the preferred embodiment includes means for converting other electrical signals into light signals and launching them into the optical fibers 25 for transmission to tool 11 (e.g., command signals for controlling operation of the sonde), a simple receiver may be used instead of transceiver 42, and the command signals can be sent downhole electrically.

Therefore, while the forms of apparatus and the methods herein described constitute preferred embodiments of this invention, it is to be understood that the invention is not limited precisely thereto and that changes may be made without departing from the scope of the invention.

I claim:

1. A well logging system for measuring characteristics of earth formations in a borehole, comprising:
   (a) a communication cable having fiber optic means therein for conducting light signals therethrough,
   (b) a tool including a sonde connected to one end of said cable,
   (c) means in said tool for measuring characteristics of earth formations in the borehole, converting the measurements into modulated light signals, and launching said modulated light signals into said fiber optic means in said cable,
   (d) a rotatable winch drum supporting said cable at the upper end of the borehole, and for lowering and raising said cable and tool into and out of the borehole in response to rotation of said winch drum,
   (e) transducer means mounted on said drum for rotation therewith and coupled to the end of said cable opposite said tool, for receiving said optical signals and converting them into electrical signals representative of said earth formation measurements,
   (f) a receiver mounted outside said drum, and
   (g) means for transmitting said electrical signals from said transducer means to said receiver for conveying the information carried by said modulated light signals out of said rotatable winch drum without the use of optical slip rings.

2. The system of claim 1 wherein said means for transmitting said electrical signals comprises electrical slip rings.

3. The system of claim 1 wherein said receiver further comprises a transceiver and said transducer means further comprises means for converting other electrical signals into modulated light signals and launching the light signals into said fiber optic means in said cable for transmission to said tool.

4. The system of claim 1 wherein said transducer means is mounted within said drum.

5. A well logging system for measuring characteristics of earth formations in a borehole, comprising:
   (a) a communication cable having fiber optic means therein for conducting light signals therethrough,
   (b) a tool including a sonde connected to one end of said cable,
   (c) means in said tool for measuring characteristics of earth formations in the borehole, converting the measurements into modulated light signals, and launching said modulated light signals into said fiber optic means in said cable,
   (d) a rotatable winch drum supporting said cable at the upper end of the borehole for lowering and raising said cable and tool into and out of the borehole in response to rotation of said winch drum,
   (e) transducer means mounted within said drum for rotation therewith and coupled to the end of said cable opposite said tool for
      (i) receiving said optical signals and converting them into electrical signals representative of said earth formation measurements, and
      (ii) converting other electrical signals into modulated light signals and launching them into said fiber optic means in said cable for transmission to said tool, (f) a transceiver mounted outside said drum, and (g) electrical slip rings for transmitting said electrical signals between said transducer means and said transceiver for conveying the information carried or to be carried by said light signals into and out of said rotatable winch drum without the use of optical slip rings.

6. A winch unit for ue in measuring characteristics of earth formations in a borehole, comprising:

(a) a rotatable winch drum for supporting a communication cable containing one or more optical fibers, (b) electro-optical transducer means mounted on said drum for rotation therewith, (c) coupling means on said transducer means for coupling thereto at least one optical fiber in such a communication cable, (d) said transducer means including means for receiving modulated optical signals from such an optical fiber and converting them into electrical signals, and (e) means for transmitting said electrical signals from said transducer means out of said drum to convey the information carried by such modulated light signals out of said rotatable winch drum without the use of optical slip rings.

7. The structure of claim 6 wherein said means for transmitting said electrical signals comprises electrical slip rings.

8. The structure of claim 6 wherein said transducer means further comprises means for converting other electrical signals into modulated light signals and launching the light signals into such a fiber optic containing cable for transmission therethrough; and further comprising means for receiving said other electrical signals and conveying said other electrical signals to said transducer means.

9. A well logging method for measuring characteristics of earth formations in a borehole, comprising:

(a) supporting a well logging cable containing fiber optic means on a rotatable winch drum for lowering and raising the cable into and out of the borehole in response to rotation of the winch drum, (b) launching modulated light signals representative of characteristics of the earth formations into the end of the fiber optic means opposite the drum, (c) receiving the modulated light signals from the fiber optic means in a transducer mounted on the drum and converting them on the drum into electrical signals representative of the earth formation measurements, and (d) transmitting the electrical signals from the drum to a receiver mounted outside the drum to convey the information carried by the modulated light signals out of the rotatable winch drum without the use of optical slip rings.

10. The method of claim 9 wherein said transmitting step comprises transmitting the electrical signals through electrical slip rings.

11. The method of claim 9 further comprising converting other electrical signals into light signals on the drum and launching the light signals into the fiber optic means for transmission to the end thereof opposite the drum.

12. A well logging method for measuring characteristics of earth formations in a borehole, comprising:

(a) supporting a well logging cable containing fiber optic means on a rotatable winch drum for lowering and raising the cable into and out of the borehole in response to rotation of the winch drum, (b) launching modulated light signals representative of characteristics of the earth formations into the end of the fiber optic means opposite the drum, (c) receiving the modulated light signals from the fiber optic means in a transducer mounted on the drum and converting them on the drum into electrical signals representative of the earth formation measurements, (d) converting other electrical signals into light signals on the drum and launching the light signals into the fiber optic means for transmission to the end thereof opposite the drum, and (e) transmitting the electrical signals through electrical slip rings between the drum and a transceiver mounted outside the drum to convey the information carried by the light signals into and out of the rotatable winch drum without the use of optical slip rings.

* * * * *